(12) United States Patent
Li

(10) Patent No.: US 10,915,903 B2
(45) Date of Patent: Feb. 9, 2021

(54) TRANSACTION CONFIRMATION BASED ON USER ATTRIBUTES

(71) Applicant: Alibaba Group Holding Limited, George Town (KY)

(72) Inventor: Lizhong Li, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 162 days.

(21) Appl. No.: 16/047,648

(22) Filed: Jul. 27, 2018

(65) Prior Publication Data
US 2018/0349905 A1  Dec. 6, 2018

Related U.S. Application Data

(63) Continuation of application No. PCT/CN2017/071414, filed on Jan. 17, 2017.

(30) Foreign Application Priority Data

Jan. 27, 2016  (CN) .......................... 2016 1 0056711

(51) Int. Cl.
*G06Q 20/40* (2012.01)
*G06Q 20/38* (2012.01)

(52) U.S. Cl.
CPC ....... *G06Q 20/4014* (2013.01); *G06Q 20/384* (2020.05); *G06Q 20/388* (2013.01); *G06Q 20/3821* (2013.01); *G06Q 20/4016* (2013.01)

(58) Field of Classification Search
CPC ............................. G06Q 50/01; G06Q 30/0609
See application file for complete search history.

(56) References Cited

U.S. PATENT DOCUMENTS 9,818,117 B2* 11/2017 Groarke ................. G06Q 50/01
2014/0067656 A1* 3/2014 Cohen Ganor ........ G06Q 50/01
705/39

(Continued)

FOREIGN PATENT DOCUMENTS

CN  102110258   6/2011
CN  202771477   3/2013

(Continued)

OTHER PUBLICATIONS

PCT International Preliminary Report on Patentability in International Application No. PCT/CN2017/071414, dated Jul. 31, 2018, 9 pages (with English translation).

(Continued)

*Primary Examiner* — Jay Huang
(74) *Attorney, Agent, or Firm* — Fish & Richardson P.C.; Indranil Sarkar; Alexander Berg

(57) ABSTRACT

Techniques for providing a risk control method and device for resolving the issue of low application software security are described. A transaction request is received from a first user, and the transaction request comprises transaction data, data identifying the first user, and data identifying a second user. An attribute of the first user is determined from the data identifying the first user. An attribute of the second user is identified using the data identifying the second user. In response to the attribute of the first user being determined and the attribute of the second user being identified, an attribute similarity between the first user and the second user is determined. The attribute similarity is compared to a threshold. In response to determining the attribute similarity is less than the threshold, a notification is transmitted to the first user requesting a confirmation of the identified attribute of the second user.

15 Claims, 4 Drawing Sheets

(56) References Cited

U.S. PATENT DOCUMENTS

| | | | | |
|---|---|---|---|---|
| 2014/0172693 A1* | 6/2014 | Kanjlia | ............... | G06Q 20/10 705/39 |
| 2014/0351118 A1 | 11/2014 | Zhao | | |
| 2015/0058419 A1 | 2/2015 | Tai | | |
| 2016/0103997 A1* | 4/2016 | Lu | ............... | H04L 63/102 726/22 |
| 2016/0104133 A1* | 4/2016 | Davis | ............... | G06Q 20/10 705/39 |

FOREIGN PATENT DOCUMENTS

| | | |
|---|---|---|
| CN | 103236005 | 8/2013 |
| CN | 103530772 | 1/2014 |
| EP | 1400935 | 3/2004 |
| EP | 2128809 | 12/2009 |
| FR | 2842319 | 1/2004 |
| JP | 2010186329 | 8/2010 |
| JP | 20130206285 | 10/2013 |
| JP | 2016048420 | 4/2016 |
| TW | 201227571 | 7/2012 |
| WO | WO 2013125394 | 8/2013 |

OTHER PUBLICATIONS

International Search Report and Written Opinion of the International Searching Authority issued in International Application No. PCT/CN2017/071414 dated Apr. 27, 2017; 13 pages.
Crosby et al., "BlockChain Technology: Beyond Bitcoin," Sutardja Center for Entrepreneurship & Technology Technical Report, Oct. 16, 2015, 35 pages.
Extended European Search Report in European Application No. 17743614.4, dated Jun. 5, 2019, 8 pages.
Nakamoto, "Bitcoin: A Peer-to-Peer Electronic Cash System," www.bitcoin.org, 2005, 9 pages.

* cited by examiner

TRANSACTION CONFIRMATION BASED ON USER ATTRIBUTES

CROSS-REFERENCE TO RELATED APPLICATIONS

This application is a continuation of PCT Application No. PCT/CN2017/071414, filed on Jan. 17, 2017, which claims priority to Chinese Patent Application No. 201610056711.X, filed on Jan. 27, 2016, and each application is hereby incorporated by reference in its entirety.

TECHNICAL FIELD

The present application relates to the field of Internet information technology and computer technology, and in particular, to a risk control method and device.

BACKGROUND

With the development of Internet technology, more people use the Internet as a platform to perform various transactions, such as purchasing products and paying for electricity bills and phone bills. Apparently, people's life is more dependent on the Internet.

To provide more convenient services to people, software developers have developed a variety of application software, so that people can enjoy various convenient services provided by the Internet by using application software installed on smart terminal devices, personal computers, or other smart devices. In addition, developers constantly improve functions of the applications and simplify user operations, thereby making services more convenient.

For example, if user A needs to send a piece of sensitive information to (e.g., an account password, a payment behavior, etc.) to user B, two methods may be used in an actual operation:

Method 1: When sending the sensitive information to user B, user A inputs account information of user B, and sends the account information and the sensitive information to a server. The server identifies pre-stored information of user B (such as a name of user B) that corresponds to the account information, and pushes the identified information to user A. When it is determined that the pre-stored information is correct, user A triggers the server to send the sensitive information to user B.

Method 2: When sending the sensitive information to user B, user A inputs account information of user B, and sends the account information and the sensitive information to a server. The server can directly push the received sensitive information to a user corresponding to the account information based on the received account information.

Apparently, operations in Method 2 are simpler than operations in Method 1. However, some study shows that Method 2 has a relatively high security risk. More specifically, when the user B's account information input by user A is actually user C's account information instead of user B's account information, and if user A has not identified any input error, loss can occur to user A once the server responds to the request of user A.

SUMMARY

In view of this, implementations of the present application provide a risk control method and device, to resolve the problem of low application software security caused by user mistakes in an existing technology.

The risk control method includes: receiving a payment request sent by a first user, and determining a user attribute of the first user, where the payment request includes identification information of a second user; searching a user attribute database for a user attribute of the second user corresponding to the identification information of the second user included in the payment request based on the identification information of the second user, where the user attribute database stores user attributes of different users; determining a user attribute similarity between the first user and the second user by using the user attribute of the first user and the user attribute of the second user, where the user attribute similarity is used to represent a possibility of establishing a social relationship between the first user and the second user; and performing, based on the user attribute similarity, risk control on the payment request sent by the first user.

The risk control device includes: a receiving unit, configured to receive a payment request sent by a first user, and determine a user attribute of the first user, where the payment request includes identification information of a second user; a search unit, configured to search a user attribute database for a user attribute of the second user corresponding to the identification information of the second user included in the payment request based on the identification information of the second user, where the user attribute database stores user attributes of different users; a determining unit, configured to determine a user attribute similarity between the first user and the second user by using the user attribute of the first user and the user attribute of the second user, where the user attribute similarity is used to represent a possibility of establishing a social relationship between the first user and the second user; and a control unit, configured to perform, based on the user attribute similarity, risk control on the payment request sent by the first user.

The present application has the following beneficial effects:

In the implementations of the present application, the payment request sent by the first user is received, and the user attribute of the first user is determined, where the payment request includes the identification information of the second user; the user attribute database is searched for the user attribute of the second user corresponding to the identification information of the second user included in the payment request based on the identification information of the second user; the user attribute similarity between the first user and the second user is determined by using the user attribute of the first user and the user attribute of the second user; and risk control is performed, based on the user attribute similarity, on the payment request sent by the first user. In addition to responding to the payment request sent by the first user, a server needs to determine the user attribute similarity between the first user and the second user based on the user attribute of the second user included in the payment request and the user attribute of the first user, and determine whether the payment request sent by the first user is potentially incorrect based on the determined user attribute similarity. As such, low application software security caused by user mistakes can be effectively avoided, and payment security can be effectively improved.

BRIEF DESCRIPTION OF DRAWINGS

To describe the technical solutions in the implementations of the present application more clearly, the following briefly describes the accompanying drawings required for describing the implementations. Apparently, the accompanying drawings in the following description show merely some implementations of the present application, and a person of ordinary skill in the art can still derive other drawings from these accompanying drawings without creative efforts.

DESCRIPTION OF EMBODIMENTS

Figure 1:
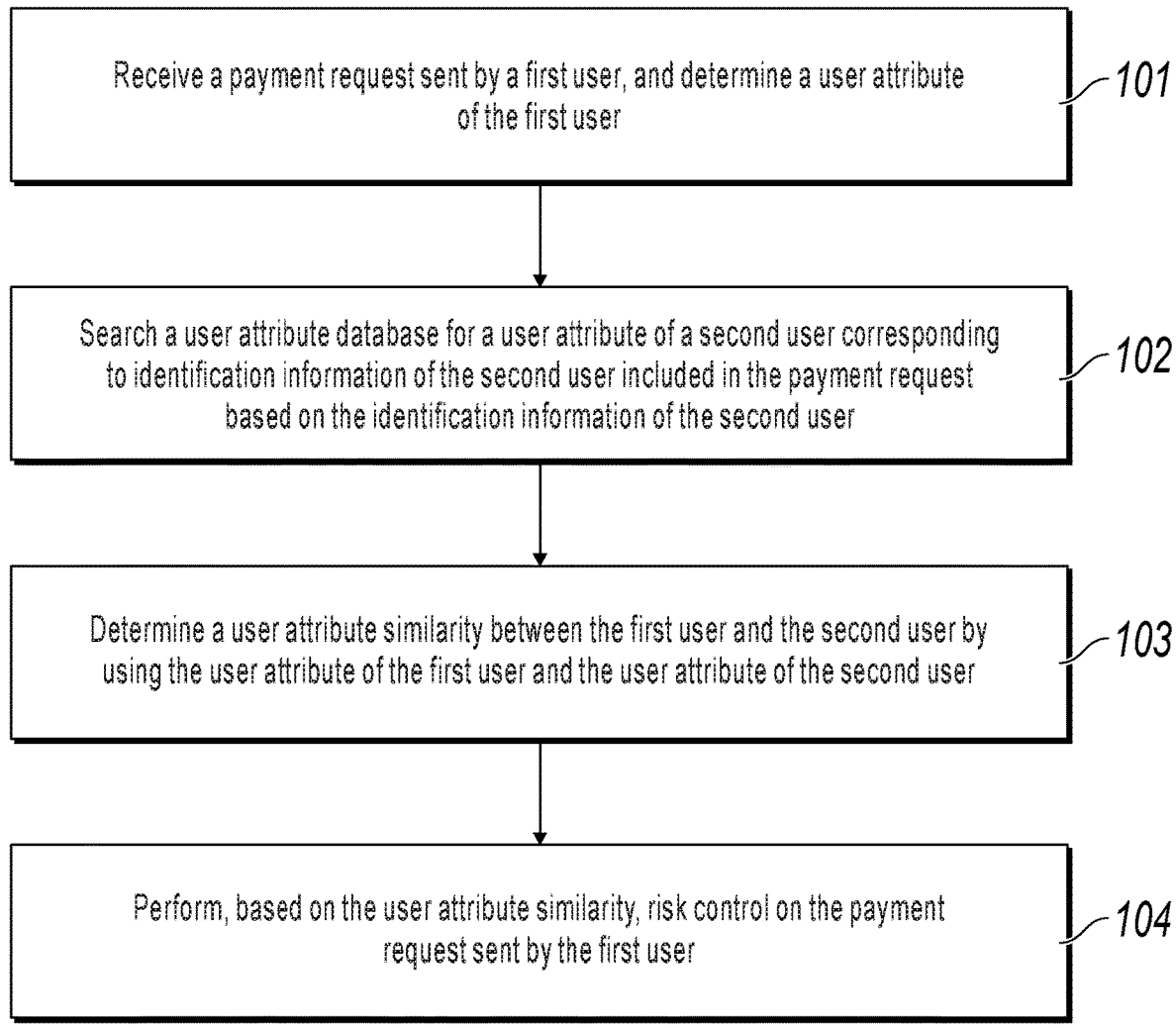
FIG. 1 is a flowchart illustrating a risk control method, according to an implementation of the present application.

In an actual application, to help payment operations between different users, a relatively simple operation method is provided. A source user can send a payment request to a server based on identification information of a target user. For example, user A needs to transfer 100 RMB to user B via an Internet platform. If user A completes the transfer via a third-party payment platform, user A can transfer 100 RMB to user B as long as user A provides a server of the third-party payment platform with identification information it registered on the third-party payment platform and the transfer amount. However, because the identification information registered by user B on the third-party payment platform may have a relatively low security level, the identification information may be similar to identification information of other users. If the identification information of user B input by user A is incorrect, and user A is unaware of the error, fund loss can occur to user A, and fund transfer security may be compromised.

To achieve the purpose of the present application, the implementations of the present application provide a risk control method and device. In addition to responding to a payment request sent by a first user, a server needs to determine a user attribute similarity between the first user and a second user based on the second user's user attribute included in the payment request and the user attribute of the first user. The server then determines whether the payment request sent by the first user is potentially incorrect based on the determined user attribute similarity. As such, low application software security caused by user mistakes can be effectively reduced, and payment security can be effectively improved.

The risk control method provided in the implementations of the present application can be implemented based on a third-party payment platform, instant messaging software provided by a software developer, or other software having payment capabilities.

It is worthwhile to note that, a payment request described in the implementations of the present application not only includes shopping payment (that is, a buyer purchases a product from a seller, and pays the seller accordingly), but can also include fund transfer between different users, and can even include sending virtual "red envelope" between different users. Specific implementations are not limited here.

User attributes described in the implementations of the present application can include location of the user when the user registers with the server, location of the user when the user sends a payment request, user's education background, user's job type, user's occupation, phone number used when the user registers with the server, and user's birthplace. Specific implementations are not limited in the present application.

A user attribute similarity described in the implementations of the present application can be the number of same user attribute types and contents shared between the user and a third user. A larger number indicates a higher user attribute similarity, and a smaller number indicates a lower user attribute similarity.

Alternatively, a user attribute similarity can be a weight of a user attribute with the same attribute type and content shared between the user and third user. A larger weight indicates a higher user attribute similarity, and a smaller weight indicates a lower user attribute similarity.

"First" and "second" in "first user" and "second user" described in the implementations of the present application are merely used to distinguish between different users without indicating other special meanings.

The following further describes the implementations of the present application in detail with reference to the accompanying drawings in this specification. Apparently, the described implementations are merely some rather than all of the implementations of the present application. Other implementations obtained by a person of ordinary skill in the art based on the implementations of the present application without creative efforts shall fall within the protection scope of the present application.

FIG. 1 is a flowchart illustrating a risk control method, according to an implementation of the present application. The method can be shown as follows:

Step 101: Receive a payment request sent by a first user, and determine a user attribute of the first user.

The payment request includes identification information of a second user.

In step 101, when the first user needs to make a payment to the second user, the first user sends the payment request to a server by using client software.

The client software here can be an application (APP) having a payment capability developed by a third-party service platform, or can be an APP corresponding to a third-party payment platform. The client software is not limited here.

The server here is a server corresponding to the APP, that is, a server of the third-party service platform.

In step 101, the payment request sent by the first user includes the identification information of the second user. The identification information of the second user can be an email account, an instant messaging account, a phone number, a user name, a bank account, etc., which is not limited here.

When receiving the payment request sent by the first user, in an existing process, the server responds to the payment request by determining that an identity of the first user is valid. However, to improve user account security and fund security, the server needs to confirm the received payment request sent by the first user, that is, determine whether it is possible that the identification information of the second user is incorrectly input. How to determine whether the identification information of the second user may be incorrectly input is described below.

Before determining whether the identification information of the second user may be incorrectly input by the first user, the server needs to further determine the user attribute of the first user based on identification information of the first user or account information of the first user when the server receives the payment request from the first user.

More specifically, the server can determine the user attribute of the first user based on registration information of the first user and/or user behavior data of the first user, such as a registration address (e.g., Beijing) of the first user, an address (e.g., Shanghai) where the first user sends the payment request, the birthplace (e.g., Beijing) of the first user, and the place where the first user is often located (which can be determined based on historical behavior data of the user, etc.).

It is worthwhile to note that if the user attribute is address information, the address information of the user can be determined through GPS (the address information can include registration address, address of the user location, current address of a terminal device, etc.). The address information of the user can be determined based on a wireless positioning service, or the address information of the user can be determined by another positioning method, which is not limited here.

Determining a user attribute of the first user can include: searching a log information database for identification information of a third user that has a social relationship with the identification information of the first user; and determining the user attribute of the first user if the identification information of the third user does not include the identification information of the second user.

When it is determined that the identification information of the third user includes the identification information of the second user, the identified identification information of the third user that is the same as the identification information of the second user is sent to the first user, and the first user is notified to confirm the identification information of the third user and the identification information of the second user.

In addition, when receiving the payment request sent by the first user, the server further needs to determine whether a payment has been previously performed between the first user and the second user. Because the user behavior data of the first user on an Internet platform is stored in the log information database of the server, it can be determined whether payment has occurred between the first user and the second user included in the payment request by searching the log information database. If it is identified from the log information database that the identification information of a third user that has a social relationship with the identification information of the first user does not include the identification information of the second user, it can indicate that payment between the first user and the second user occurred for the first time. Therefore, whether the identification information of the second user included in the payment request sent by the first user is incorrect needs to be estimated.

If it is identified from the log information database that the identification information of the third user that has a social relationship with the identification information of the first user includes the identification information of the second user, it indicates that the identification information of the third user that has made payment with the first user is the same as the identification information of the second user included in the payment request. If the identification information is an email address, a user name, an instant messaging identifier, etc. that is not unique, the first user needs to be notified to determine whether the identification information of the second user is incorrect.

Specifically, the server can send the identified identification information of the third user that has the same identification information as the second user to the first user, and notifies the first user to confirm the identification information of the third user and the identification information of the second user.

Step 102: Search a user attribute database for a user attribute of a second user that corresponds to identification information of the second user included in the payment request based on the identification information of the second user.

The user attribute database stores user attributes of different users.

In step 102, the server determines the user attribute of the second user based on the identification information of the second user.

Here, the user attribute of the second user can be determined as follows: The user attribute database can be searched to identify the user attribute of the second user corresponding to the identification information of the second user, or the user attribute of the second user is determined based on registration information of the second user and/or user behavior data of the second user. The implementations of the method are not limited here.

The user attribute database described in this implementation of the present application can be a database for storing user attributes. Mapping relationships between identification information of users and user attributes can be established in the user attribute database, so that the user attributes can be determined by using the identification information of the user.

It is worthwhile to note that the identification information of the user can uniquely identify the user, and it can be a user ID, or multiple pieces of user identification information, such as a user name and an email address. Alternatively, a user ID that uniquely identifies each user can be generated for the user in the user attribute database. Other implementations are not limited here.

Step 103: Determine a user attribute similarity between the first user and the second user by using the user attribute of the first user and the user attribute of the second user.

The user attribute similarity is used to represent a possibility of establishing a social relationship between the first user and the second user.

In step 103, the number of user attributes with the same types and contents shared between the first user and the second user is calculated, and the user attribute similarity between the first user and the second user is determined based on the number. A larger number corresponds to a higher user attribute similarity and a smaller number corresponds to a lower user attribute similarity.

Specifically, the types of the user attributes of the first user and the types of the user attributes of the second user are separately determined, user attributes with the same types shared between the first user and the second user are selected, and the number of user attributes with the same contents shared between the first user and the second user is determined from the user attributes of the same types.

The user attribute similarity between the first user and the second user is determined based on the number. A larger number corresponds to a higher user attribute similarity and a smaller number corresponds to a lower user attribute similarity.

In addition, a weight can also be determined for each user attribute type. To determine the user attribute similarity between the first user and the second user, a factor of a user attribute that is included in both the first user and the second user is set to 1. A factor of a user attribute exclusive to the first user or the second user is set to 0. A user attribute value of the first user and a user attribute value of the second user are separately calculated based on the weight and the factor and a difference between the user attribute value of the first user and the user attribute value of the second user is calculated. The obtained difference is the user attribute similarity between the first user and the second user.

It is worthwhile to note that the weight can be set based on impact of the user attribute on the possibility of establishing a social relationship between the first user and the second user. Stronger impact can result in a larger weight to be set, and a weaker impact can result in a smaller weight to be set. For example, impact of a family relationship is larger than impact of a friendly relationship.

Step 104: Perform, based on the user attribute similarity, risk control on the payment request sent by the first user.

In step 104, when the user attribute similarity is less than a specified threshold, a notification message is sent to the first user. The notification message is used to notify the first user to confirm the identification information of the second user included in the payment request; or when the user attribute similarity is not less than a specified threshold, a response is made to the payment request sent by the first user.

In the technical solution provided in this implementation of the present application, the payment request sent by the first user is received and the user attribute of the first user is determined. The payment request includes the identification information of the second user. The user attribute database is searched to identify the user attribute of the second user that corresponds to the identification information of the second user included in the payment request based on the identification information of the second user. The user attribute database stores user attributes of different users. The user attribute similarity between the first user and the second user is determined by using the user attribute of the first user and the user attribute of the second user. The user attribute similarity is used to represent the possibility of establishing a social relationship between the first user and the second user. Risk control is performed, based on the user attribute similarity, on the payment request sent by the first user. In addition to responding to the payment request sent by the first user, the server needs to determine the user attribute similarity between the first user and the second user based on the user attribute of the second user included in the payment request and the user attribute of the first user. The server also determines whether the payment request sent by the first user may be incorrect based on the determined user attribute similarity. As such, low security caused by user mistakes can be effectively reduced, and payment security can be effectively improved.

Figure 2:
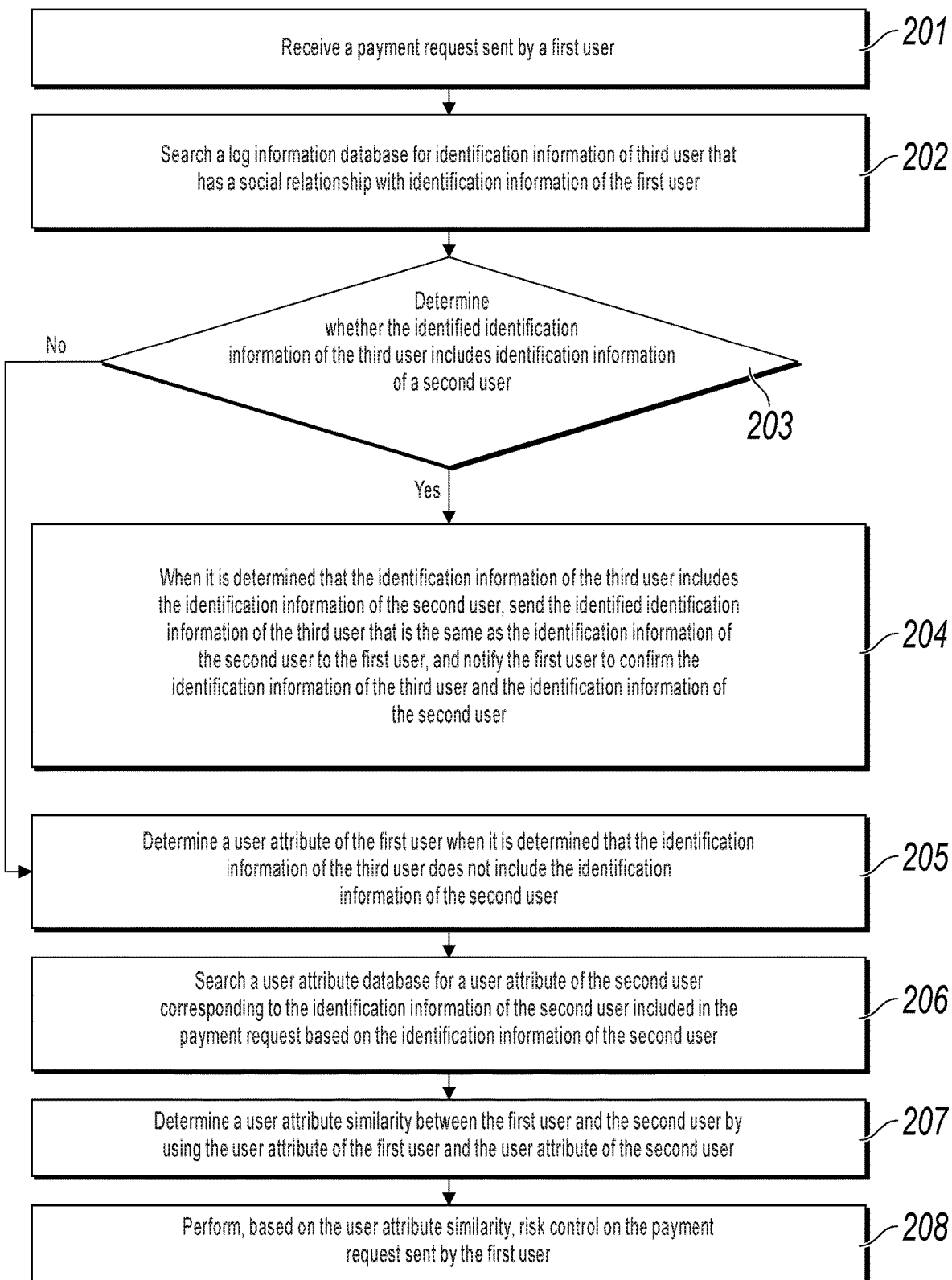
FIG. 2 is a flowchart illustrating a risk control method, according to an implementation of the present application.

FIG. 2 is a flowchart illustrating a risk control method, according to an implementation of the present application. The method can be described as follows:

Step 201: Receive a payment request sent by a first user.

The payment request includes identification information of a second user.

Step 202: Search a log information database for identification information of a third user that has a social relationship with identification information of the first user.

Step 203: Determine whether the identified identification information of the third user includes identification information of a second user. If the identified identification information of the third user does not include the identification information of the second user, perform step 205. Otherwise, if the identified identification information of the third user includes the identification information of the second user, perform step 204.

Step 204: When it is determined that the identification information of the third user includes the identification information of the second user, send the identified identification information of the third user that is the same as the identification information of the second user to the first user, and notify the first user to confirm the identification information of the third user and the identification information of the second user.

Step 205: Determine a user attribute of the first user when it is determined that the identification information of the third user does not include the identification information of the second user.

Step 206: Search a user attribute database for a user attribute of the second user corresponding to the identification information of the second user included in the payment request based on the identification information of the second user.

The user attribute database stores user attributes of different users.

Step 207: Determine a user attribute similarity between the first user and the second user by using the user attribute of the first user and the user attribute of the second user.

The user attribute similarity can be used to represent a possibility of establishing a social relationship between the first user and the second user.

Step 208: Perform, based on the user attribute similarity, risk control on the payment request sent by the first user.

In addition to responding to the payment request sent by the first user, a server needs to determine the user attribute similarity between the first user and the second user based on the user attribute of the second user included in the payment request and the user attribute of the first user, and determine whether the payment request sent by the first user may be incorrect based on the determined user attribute similarity. As such, low security caused by user mistakes can be effectively reduced, and payment security can be effectively improved.

Figure 3:
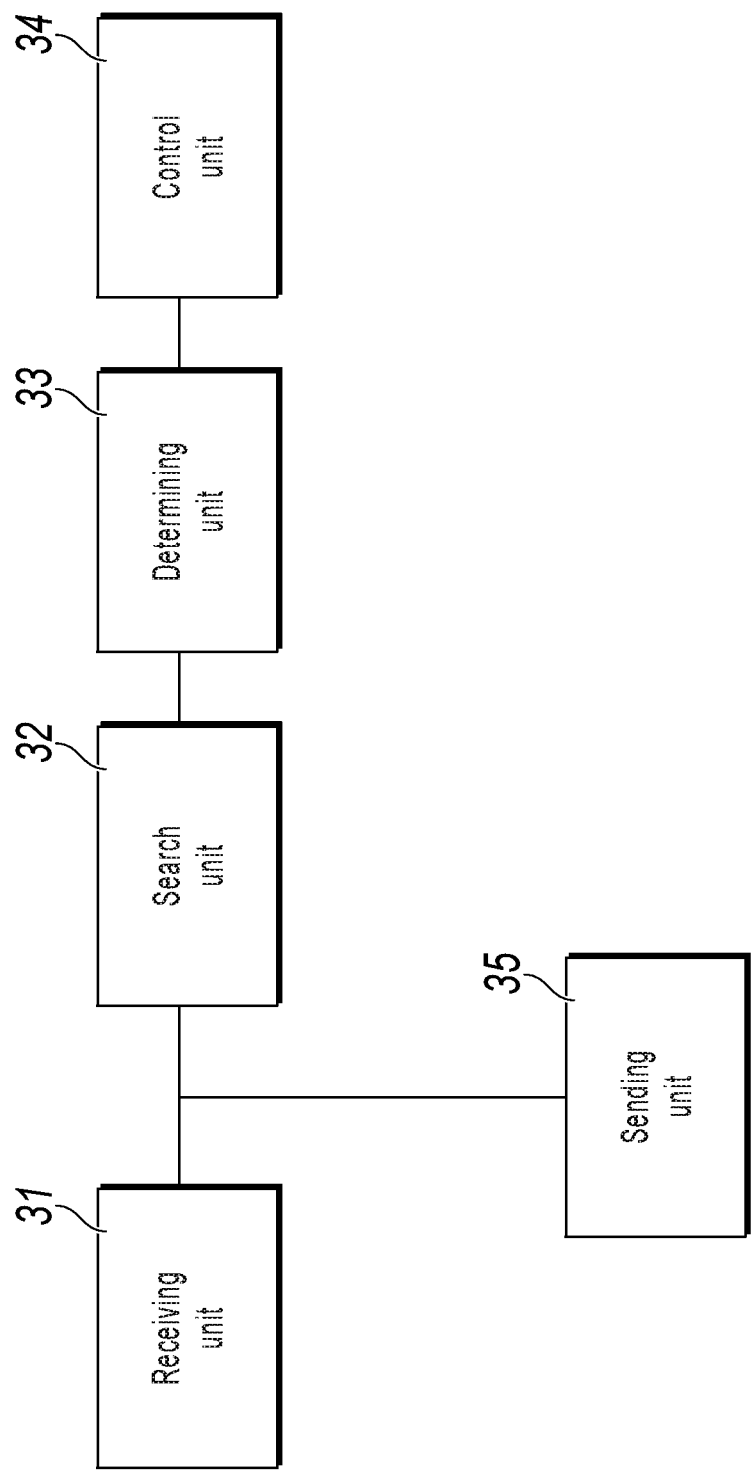
FIG. 3 is a structural diagram illustrating a risk control device, according to an implementation of the present application.

FIG. 3 is a structural diagram illustrating a risk control device, according to an implementation of the present application. The risk control device includes a receiving unit 31, a search unit 32, a determining unit 33, and a control unit 34.

The receiving unit 31 is configured to receive a payment request sent by a first user and determine a user attribute of the first user. The payment request includes identification information of a second user.

The search unit 32 is configured to search a user attribute database for a user attribute of the second user corresponding to the identification information of the second user included in the payment request based on the identification information of the second user. The user attribute database stores user attributes of different users.

The determining unit 33 is configured to determine a user attribute similarity between the first user and the second user by using the user attribute of the first user and the user attribute of the second user. The user attribute similarity is used to represent a possibility of establishing a social relationship between the first user and the second user.

The control unit 34 is configured to perform, based on the user attribute similarity, risk control on the payment request sent by the first user.

In another implementation of the present application, that the receiving unit 31 determines the user attribute of the first user includes: searching a log information database for identification information of the third user that has a social relationship with identification information of the first user; and determining the user attribute of the first user when it is determined that the identification information of the third user does not include the identification information of the second user.

In another implementation of the present application, the risk control device further includes a sending unit 35.

The sending unit 35 is configured to: when it is determined that the identification information of the third user includes the identification information of the second user, send the identified identification information of the third user that is the same as the identification information of the second user to the first user, and notify the first user to confirm the identification information of the third user and the identification information of the second user.

In another implementation of the present application, that the determining unit 33 determines the user attribute similarity between the first user and the second user by using the user attribute of the first user and the user attribute of the second user includes: calculating the number of user attributes with the same types and contents shared between the first user and the second user, and determining the user attribute similarity between the first user and the second user based on the number. A larger number corresponds to a higher user attribute similarity and a smaller number corresponds to a lower user attribute similarity.

In another implementation of the present application, that the control unit 34 performs, based on the user attribute similarity, risk control on the payment request sent by the first user includes: when the user attribute similarity is less than a specified threshold, sending a notification message to the first user. The notification message is used to notify the first user to confirm the identification information of the second user included in the payment request; or when the user attribute similarity is not less than a specified threshold, responding to the payment request sent by the first user.

It is worthwhile to note that the risk control device described in this implementation of the present application can be implemented by hardware, or can be implemented by software. Other implementations are not limited here.

In addition to responding to the payment request sent by the first user, the risk control device described in this implementation of the present application needs to determine the user attribute similarity between the first user and the second user based on the user attribute of the second user included in the payment request and the user attribute of the first user, and determine whether the payment request sent by the first user may be incorrect based on the determined user attribute similarity. As such, low security caused by user mistakes can be effectively reduced, and payment security can be effectively improved.

A person skilled in the art should understand that the implementations of the present application can be provided as a method, an apparatus (device), or a computer program product. Therefore, the present application can use a form of hardware only implementations, software only implementations, or implementations with a combination of software and hardware. Moreover, the present application can use a form of a computer program product implemented on one or more computer-readable storage media (including but not limited to a magnetic disk memory, a CD-ROM, an optical memory, etc) that include computer readable program code.

The present application is described with reference to the flowcharts and/or block diagrams of the method, the apparatus (device), and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specified function in one or more processes in the flowcharts and/or in one or more blocks in the block diagrams.

These computer program instructions can be loaded to the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred implementations of the present application have been described, a person skilled in the art can make changes and modifications to these implementations once they learn the basic inventive concept. Therefore, the following claims are intended to be construed as to cover the preferred implementations and all changes and modifications falling within the scope of the present application.

Apparently, a person skilled in the art can make various modifications and variations towards the present application without departing from the spirit and scope of the present application. The present application is intended to cover these modifications and variations of the present application provided that they fall within the scope of protection described by the following claims and their equivalent technologies.

Figure 4:
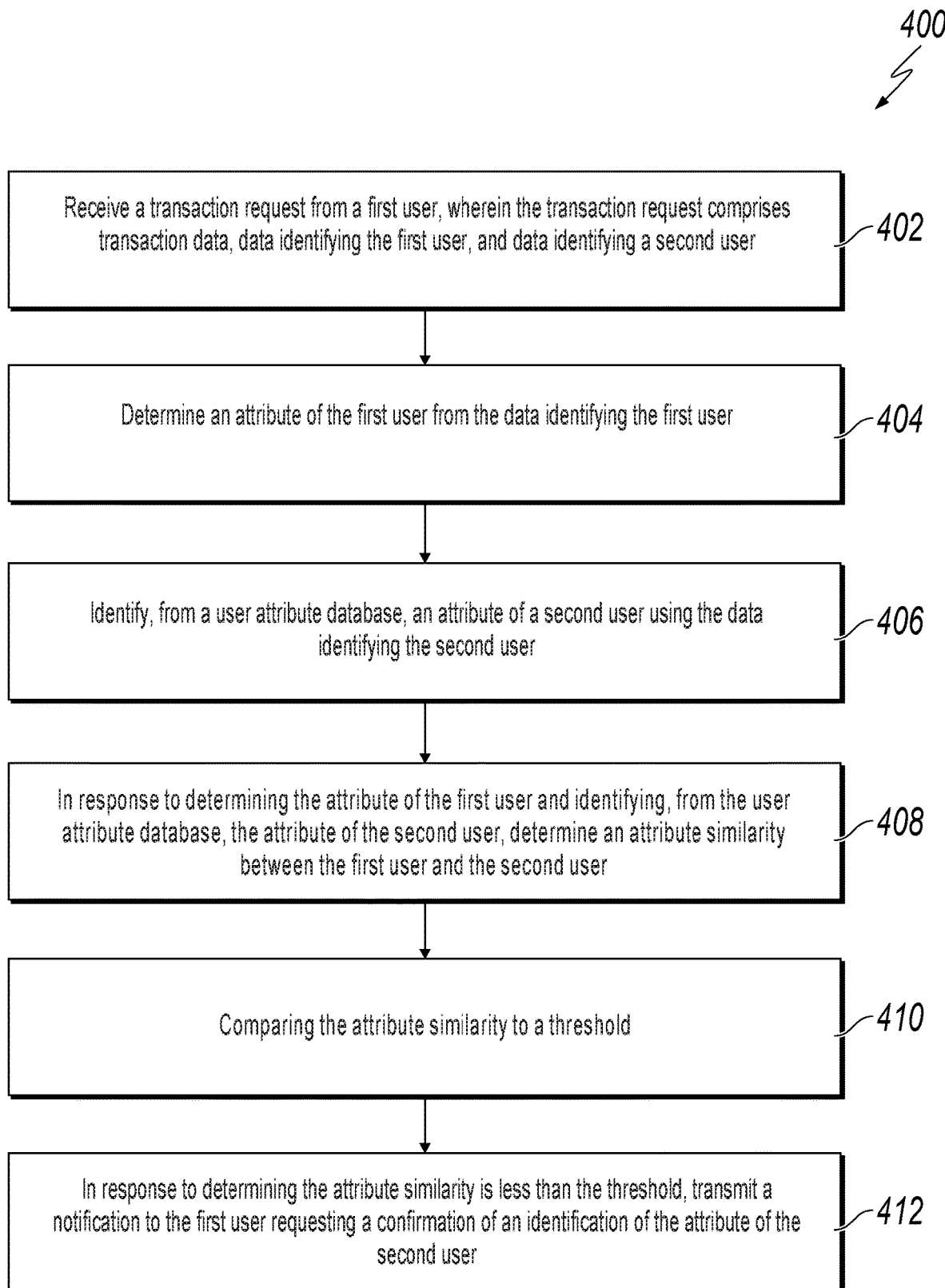
FIG. 4 is a flowchart illustrating an example of a computer-implemented method for a risk control method, according to an implementation of the present disclosure.

FIG. 4 is a flowchart illustrating an example of a computer-implemented method 400 for a risk control method, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a server receives a transaction request from a first user, and the transaction request includes transaction data, data identifying the first user, and data identifying a second user. The transaction request can include transaction data that describes the transaction type. In one example, the transaction request indicates a payment transfer of a particular amount from the first user to a second user. In another example, the transaction request indicates a payment transfer of a particular amount from a second user to a first user. In another example, the transaction request indicates sending sensitive information between the first and second user. In another example, the transaction request can indicate a secure exchange of information that allows a first user access to a particular website that requires logon information. In another example, the transaction request can indicate a secure video conference call between the first user and the second user.

The server can determine from the received transaction request data identifying the first user. For example, the data identifying the first user can include a telephone number, an email account, an instant messaging account, a user name of a particular account, bank account information, and other various user account information. Similarly, the transaction request data can include data identifying the second user. In some implementations, the data identifying the second user can be input by the first user into the first client device when initiating the transaction request. In other implementations, the data identifying the second user can be auto-populated by the first user from previous transactions between the first user and the second user. The data identifying the second user can similarly include a telephone number, an email account, an instant messaging account, a user name of a particular account, bank account information, and other various user account information. From 402, method 400 proceeds to 404.

At 404, the server determines an attribute of a first user corresponding to the first user from the transaction request. The attribute of the first user can include registration information of the first user or behavior data of the first user. For example, the registration information can include a registration address, an address where the first user transmitted the transaction request, the birthplace of the first user, and a location of the first user provided by GPS coordinates of the first user.

In some implementations, the server can also search a user attribute database for various users with similar attribute types. The user attribute database stores attributes for one or more registered user. In particular, the server can search the user attribute database for a third user that has a social relationship with the first user. For example, the social relationship can indicate that the first user and the third user are friends on a social media platform; that the first user and third user are roommates and live at the same address; that the first user and the third user work at the same company; or that the first user and the third user live in the same city. In some implementations, the server can determine if one or more attributes of the identified third user match any of the data identifying the second user from the transaction request. The server can also check other attributes in the user attribute database corresponding to other users to determine if any of the data identifying the second user matches attributes from other users. If the server determines that the data identifying the second user from the transaction request matches one or more attributes from another user in the user attribute database, the server can flag the data identifying the second user entered by the first user as error. For example, if the data identifying the second user includes an email address of 123@gmail.com, and a third user is identified as having the same email address, the server can flag that the data identifying the second user has an error.

The server can transmit a notification to the first user that includes the data identifying the second user and an attribute found for the third user, for example, that matches the data identifying the client device. For example, the server will transmit a notification to the first user indicating that the data the first user entered (e.g., 123@gmail.com) matches the email address of the third user (e.g., 123@gmail.com). The server can also provide a message to the first user asking if the first user entered in the wrong email address of the second user. In response, the first user can provide the corrected information to the server. As a result, the server receives the corrected information of the second user and executes the transaction. Alternatively, if the server determines that the data identifying the second user does not match any attribute from the third user or any other attribute of another user in the user attribute database, the server recognizes that the first user entered in the data identifying the second user correctly. From 404, method 400 proceeds to 406.

At 406, the server identifies, from a user attribute database, an attribute of a second user using the data identifying the second user. The attribute types of the second user are similar to the attribute types of the first user from 404. From 406, method 400 proceeds to 408.

At 408, in response to the server determining the attribute of the first user and identifying, from the user attribute database, the attribute of the second user, the server determines an attribute similarity between the first user and the second user. In response to determining the attributes of the first user and the attributes of the second user, the server determines a similarity between the two users based on their attributes. For example, the server can determine if the first user and second user are related by family; does the first user and second user work for the same company; does the first user and second user live together or live near one another; did the first user and second user go to the same school together; is the first user and second user friends on social media, such as through FACEBOOK, INSTAGRAM, SNAPCHAT, etc.; did the first user and second user play on any of the same sports teams. The higher the number of attribute similarities between the first user and the second user, the higher the attribute similarity ranking. For example, the attribute similarity ranking can be a percentage from 0 to 100. In another example, the attribute similarity ranking can be a number from 0 to 1. In another example, the attribute similarity ranking can be a labeled tag of "BAD" to "PERFECT". From 408, method 400 proceeds to 410.

At 410, the server compares the attribute similarity to a threshold. The server can compare the attribute similarity ranking to a predefined threshold. The predefined threshold can be set by a user. Alternatively, the server can determine the predefined threshold from previous attribute similarity rankings of user devices. The server can average or determine the mean of the previous attribute similarity rankings of other user devices to determine the predefined threshold. The server can determine the attribute similarity ranking is greater than, equal to, or less than the predefined threshold value. From 410, method 400 proceeds to 412.

At 412, in response to the sever determining the attribute similarity is less than the threshold, the server transmits a notification to the first user requesting a confirmation of an identification of the attribute of the second user. The server can determine the attribute similarity ranking is less than the predefined threshold value. When this happens, the server can transmit a notification to the first user checking to see if the first user knows of the attribute of the second user. For example, the notification at the first user may recite "Do you know the current address of the second user?" The first user can answer the question with the first user and provide the answer back to the server. If the server determines the first user correctly answers the notification, then the server will execute the transaction request. Alternatively, if the first user does not correctly answer the notification, the server will deny the transaction request. If the server determines the attribute similarity ranking is greater than or equal to the predefined threshold, the server will execute the transaction request. Once the server executes the transaction request, the server can transmit a notification to the first user and the second user indicating that the transaction request has completed. After 412, method 400 stops.

As recited above, the server receives a transaction request from a first user. The server determines information from the transaction request that includes the type of the transaction request, data identifying the first user and data identifying a second user. The transaction request sets up a transaction between the first user and the second user. The server determines an attribute of a first user corresponding to the first user from the transaction request and identifies an attribute of a second user corresponding to the second user using the data identifying the second user from a user attribute database. The user attribute database stores multiple attributes for various users registered with the database. In response to determining the attribute of the first user and the attribute of the second user, the server determines an attribute similarity between the first user and the second user. The attribute similarity establishes a strength of a social relationship between the first user and the second user. The server can compare the attribute similarity to a predefined threshold. In response to determining the attribute similarity is less than the threshold, the server transmits a notification to the first user requesting a confirmation of an identification of the attribute of the second user. Thus, by performing this type of risk method verification system, mistakes entered by the first user in the first user for the transaction request can be eliminated and payment security can be efficiently improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving, by a server, a transaction request from a first user-device, wherein the transaction request comprises transaction data, data identifying a first user associated with the first user-device, and data identifying a second user who is party to the transaction request;
    determining, by the server, an attribute of the first user from the data identifying the first user;
    identifying, by the server, from a user attribute database, based on the data identifying the second user, personally identifying information of the second user different from the data identifying the second user;
    in response to determining the attribute of the first user and identifying the personally identifying information of the second user, determining, by the server, an attribute similarity between the first user and the second user;
    comparing, by the server, the attribute similarity to a threshold; determining that the attribute similarity is less than the threshold;
    in response to determining the attribute similarity is less than the threshold, transmitting, by the server, to the first user-device, a request to provide the personally identifying information of the second user;
    receiving, by the server, from the first user-device, a response to the request;
    determining, by the server, that the response correctly provides the personally identifying information of the second user; and
    based on determining that the response correctly provides the personally identifying information of the second user, executing, by the server, the transaction request.

2. The computer-implemented method of claim 1, further comprising:
    identifying, by the server, from the user attribute database, a third user having a relationship with the first user;
    determining, by the server, identification information of the third user that matches the data identifying the second user; and
    in response to determining the identification information of the third user matches the data identifying the second user, transmitting, by the server, the identification information of the third user and the data identifying the second user to the first user for confirmation.

3. The computer-implemented method of claim 2, further comprising:
    receiving, by the server, from the first user, data indicating a correction to the data identifying the second user and a confirmation of the identification information of the third user; and
    executing, by the server, the transaction request using the corrected data identifying the second user.

4. The computer-implemented method of claim 3, further comprising transmitting, by the server, a notification to the first user indicating the transaction request has been executed and completed.

5. The computer-implemented method of claim 2, further comprising in response to determining the identification information of the third user does not match the data identifying the second user, determining, by the server, that the data identifying the second user was entered correctly.

6. The computer-implemented method of claim 1, wherein the attribute similarity establishes a potential relationship between the first user and the second user.

7. A non-transitory, computer-readable medium storing one or more instructions executable by a computer system to perform operations comprising:
    receiving a transaction request from a first user-device, wherein the transaction request comprises transaction data, data identifying a first user associated with the first user-device, and data identifying a second user who is party to the transaction request;
    determining an attribute of the first user from the data identifying the first user;
    identifying, from a user attribute database, based on the data identifying the second user, personally identifying information of the second user different from the data identifying the second user;
    in response to determining the attribute of the first user and identifying the personally identifying information of the second user, determining an attribute similarity between the first user and the second user;
    comparing the attribute similarity to a threshold; determining that the attribute similarity is less than the threshold;

in response to determining the attribute similarity is less than the threshold, transmitting, to the first user-device, a request to provide the personally identifying information of the second user;

receiving, from the first user-device, a response to the request;

determining that the response correctly provides the personally identifying information of the second user; and based on determining that the response correctly provides the personally identifying information of the second user, executing the transaction request.

8. The non-transitory, computer-readable medium of claim 7, the operations further comprising:

identifying, from the user attribute database, a third user having a relationship with the first user;

determining identification information of the third user that matches the data identifying the second user; and in response to determining the identification information of the third user matches the data identifying the second user, transmitting the identification information of the third user and the data identifying the second user to the first user for confirmation.

9. The non-transitory, computer-readable medium of claim 8, the operations further comprising:

receiving, from the first user, data indicating a correction to the data identifying the second user and a confirmation of the identification information of the third user; and executing the transaction request using the corrected data identifying the second user.

10. The non-transitory, computer-readable medium of claim 9, the operations further comprising transmitting a notification to the first user indicating the transaction request has been executed and completed.

11. The non-transitory, computer-readable medium of claim 8, the operations further comprising in response to determining the identification information of the third user does not match the data identifying the second user, determining that the data identifying the second user was entered correctly.

12. The non-transitory, computer-readable medium of claim 7, wherein the attribute similarity establishes a potential relationship between the first user and the second user.

13. A computer-implemented system, comprising:

one or more computers providing a server; and one or more computer memory devices interoperably coupled with the one or more computers and having tangible, non-transitory, machine-readable media storing one or more instructions that, when executed by the one or more computers, perform one or more operations comprising:

receiving, by the server, a transaction request from a first user-device, wherein the transaction request comprises transaction data, data identifying a first user associated with the first user-device, and data identifying a second user who is party to the transaction request;

determining, by the server, an attribute of the first user from the data identifying the first user;

identifying, by the server, from a user attribute database, based on the data identifying the second user, personally identifying information of the second user different from the data identifying the second user;

in response to determining the attribute of the first user and identifying the personally identifying information of the second user, determining, by the server, an attribute similarity between the first user and the second user;

comparing, by the server, the attribute similarity to a threshold; determining that the attribute similarity is less than the threshold;

in response to determining the attribute similarity is less than the threshold, transmitting, by the server to the first user-device, a request to provide the personally identifying information of the second user;

receiving, by the server from the first user-device, a response to the request;

determining, by the server, that the response correctly provides the personally identifying information of the second user; and based on determining that the response correctly provides the personally identifying information of the second user, executing, by the server, the transaction request.

14. The computer-implemented system of claim 13, the operations further comprising:

identifying, by the server, from the user attribute database, a third user having a relationship with the first user;

determining, by the server, identification information of the third user that matches the data identifying the second user; and in response to determining the identification information of the third user matches the data identifying the second user, transmitting, by the server, the identification information of the third user and the data identifying the second user to the first user for confirmation.

15. The computer-implemented method of claim 1, wherein the personally identifying information comprises an address of the second user.

* * * * *